US007373848B2

(12) United States Patent
Viot et al.

(10) Patent No.: US 7,373,848 B2
(45) Date of Patent: May 20, 2008

(54) HAND-HELD PIPETTE COMPRISING AT LEAST ONE TRACK AND ONE BRUSH FOR DISPLAYING A VOLUME VALUE TO BE SAMPLED

(75) Inventors: Francois Viot, Auvers sur Oise (FR); Yves May, Versailles (FR)

(73) Assignee: Gilson S.A.S., Villiers-le-Bel (FR)

( * ) Notice: Subject to any disclaimer, the term of this patent is extended or adjusted under 35 U.S.C. 154(b) by 0 days.

(21) Appl. No.: 11/517,574

(22) Filed: Sep. 7, 2006

(65) Prior Publication Data

US 2007/0199390 A1 Aug. 30, 2007

Related U.S. Application Data

(63) Continuation of application No. PCT/IB2005/000469, filed on Feb. 24, 2005.

(51) Int. Cl.
*G01N 1/00* (2006.01)

(52) U.S. Cl. .................................................. 73/864.16

(58) Field of Classification Search .................... None
See application file for complete search history.

(56) References Cited

U.S. PATENT DOCUMENTS

| | | | | |
|---|---|---|---|---|
| 2,766,446 | A * | 10/1956 | Bland | 341/9 |
| 2,972,740 | A * | 2/1961 | Lahti | 341/2 |
| 3,253,213 | A * | 5/1966 | Packard | 324/423 |
| 4,760,939 | A | 8/1988 | Ball et al. | |
| 5,998,218 | A | 12/1999 | Conley et al. | |

FOREIGN PATENT DOCUMENTS

| | | |
|---|---|---|
| DE | 38/18531 A1 | 5/1988 |
| FR | 2807558 | 4/2000 |

OTHER PUBLICATIONS

International Search Report for PCT/IB2005/000469, dated May 18, 2005.

* cited by examiner

*Primary Examiner*—Robert R Raevis
(74) *Attorney, Agent, or Firm*—Foley & Lardner LLP

(57) ABSTRACT

The hand-held pipette comprises at least one track having increments, at least one brush, and a register area arranged to come into contact with each brush after it has traveled a predetermined number of increments.

9 Claims, 4 Drawing Sheets

HAND-HELD PIPETTE COMPRISING AT LEAST ONE TRACK AND ONE BRUSH FOR DISPLAYING A VOLUME VALUE TO BE SAMPLED

CROSS-REFERENCE TO RELATED APPLICATIONS

This application is a continuation application of International Application No. PCT/IB2005/000469 filed on Feb. 24, 2005, the entire contents of which is hereby incorporated by reference.

FIELD OF THE INVENTION

The invention concerns pipettes, in particular hand-held pipettes.

BACKGROUND OF THE INVENTION

There is known, in particular from the document FR-2 807 558, a hand-actuated pipette for moving a piston in the pipette with a view to sampling a liquid and subsequently ejecting this liquid. The pipette comprises means of adjusting the value of the volume of liquid to be sampled and an electronic screen 12 for displaying this value.

It is possible to calibrate this pipette by recording in the pipette control microprocessor a calibration value corresponding to a predetermined mechanical configuration of the adjustment means. The pipette comprises one or more brushes traveling over one or more tracks having increments and connected to the volume adjustment means. When the user modifies the adjustment of the volume to be sampled, the brush or brushes travel over the increments in the tracks and the microprocessor counts the number of increments traveled, which enables it to display the new volume value corresponding to the adjustment obtained.

Nevertheless, one drawback is that, if the user modifies the adjustment of the volume when the electronic part of the pipette is not supplied with current (the pipette being switched off or the energy source being exhausted), the pipette loses count of the increments traveled. The pipette, when it is once again supplied with energy, is then no longer in a position to display a correct value corresponding to the volume adjustment obtained.

One aim of the invention is to mitigate this drawback by making it possible to display a correct volume value to be sampled, even if the volume adjustment means is manipulated while the pipette is not supplied with power.

SUMMARY OF THE INVENTION

To this end, there is provided a hand-held pipette comprising at least one track having increments, at least one brush, and an independent register area for each track arranged to come into contact with each brush after it has traveled a predetermined number of increments.

The independent register area has many applications. It makes it possible to reset the microprocessor to display a correct volume value, even if the volume adjustment means is manipulated while the pipette is not supplied with power. For example, it is detected that the adjustment means is in a predetermined configuration in a bottom mechanical abutment. Next, an adjustment of the volume is modified so that the brush comes into contact with the register area. The microprocessor detects this contact, which constitutes the first contact after moving from the predetermined configuration. The microprocessor therefore knows once again the exact mechanical configuration of the adjustment means. By counting the number of increments from this contact and using a predetermined reference value, a correct volume value can be displayed.

In another application, the register area confirms the accuracy of the count of the increments by the microprocessor by measuring the number of increments traveled over the track by the brush between two contacts of the brush with the register area. Subsequently, the microprocessor compares the measured number with a value which was previously stored in the microprocessor and corresponds to the actual number of increments. If these two numbers are different, an abnormality has occurred. For example, an increment may include a bit of dirt making it unable to effect electrical contact with the brush when the brush passes over the increment.

There is also provided, a method of determining a value of a volume to be sampled by means of a hand-held pipette comprising at least one brush and at least one track having increments. The method may include detecting that a means of adjusting the volume to be sampled is in a predetermined configuration; detecting a contact of the brush with a register area independent of each track when the volume to be sampled is adjusted; and determining a volume value using a predetermined reference value.

A method of controlling a hand-held pipette is also provided in which a number of steps traveled on a track by at least one brush between two contacts of the brush with a register area is compared with a predetermined number.

Other principal features and advantages will become apparent to those skilled in the art upon a review of the following drawings, the detailed description, and the appended claims.

BRIEF DESCRIPTION OF THE DRAWINGS

The exemplary embodiments will hereafter be described with reference to the accompanying drawings, wherein like numerals will denote like elements.

DETAILED DESCRIPTION

Figure 1:
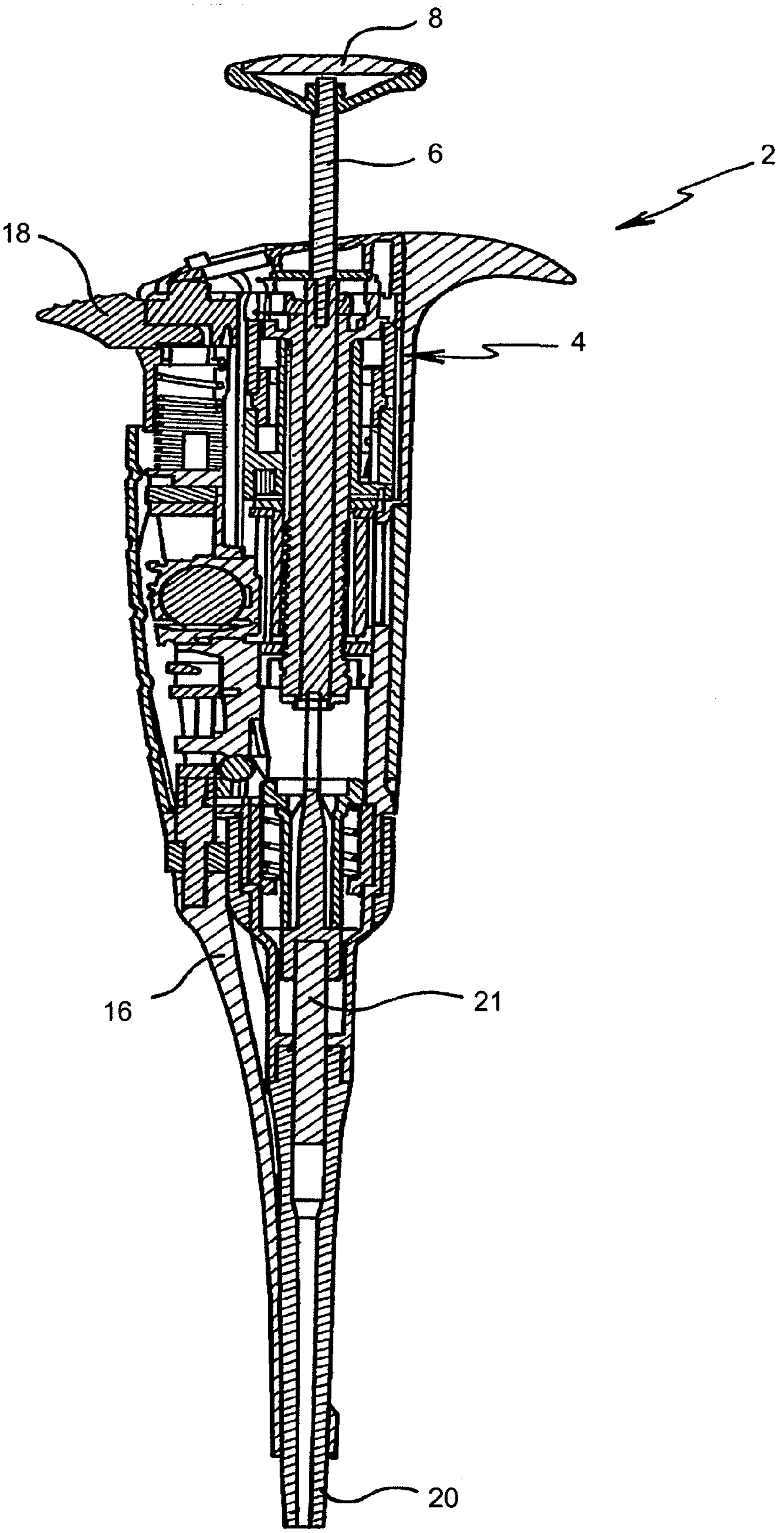
FIG. 1 is a view in longitudinal axial cross section of a pipette according to an exemplary embodiment.
Figure 2:
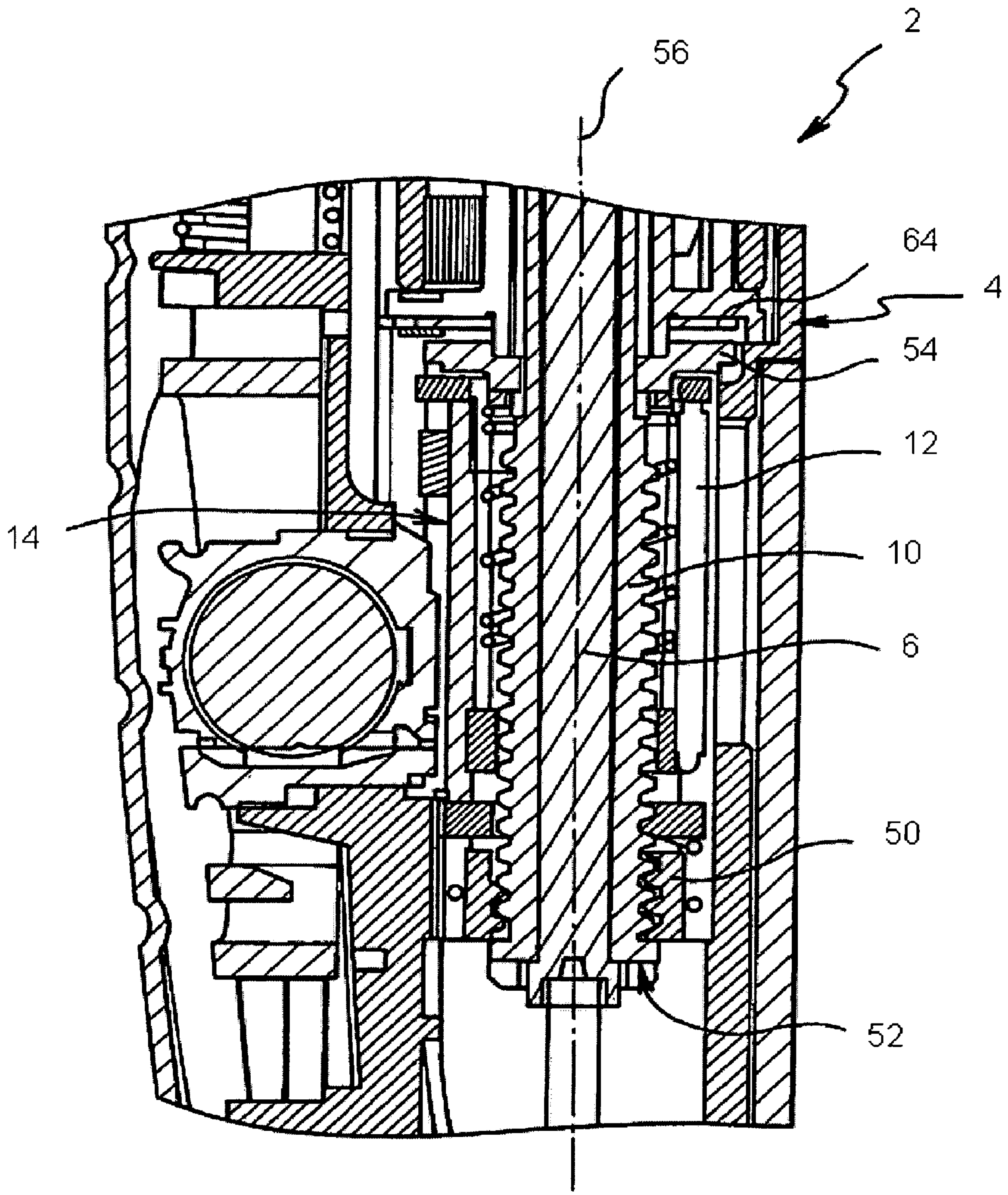
FIG. 2 is a view showing a larger scale of the middle part of the pipette of FIG. 1.

A preferred embodiment of the pipette according to the invention will be described with reference to FIGS. 1 and 2.

This pipette is essentially of the type described in the documents WO 01/76747, WO 01/76748, WO 01/76749, WO 01/76750, WO 01/76751, WO 01/76752, WO 01/76753 and FR-2 807 558. Only the characteristics relating to the invention and not described in these prior documents will therefore be presented here.

In summary, the pipette 2 comprises a body 4, a control rod 6 provided at its top end with an actuation knob 8, an adjustment screw 10, a liquid crystal screen 12 for the display of information, in particular a value of a volume to be sampled, an electronic circuit 14 for controlling the display and the pipette, and a device 16 comprising a knob 18 allowing the ejection of a removable cone, not shown, fixed to a bottom end 20 of the pipette in a manner known per se. The rod 6 makes it possible to control a piston 21 for aspirating into the cone a liquid sample to be aspirated or ejected from the cone.

The pipette is a hand-held pipette actuatable by hand and not motorized. In use, the user grips the body 4 in their hand and actuates, as required, the button 8 or the button 18 by means of their fingers, for example, their thumb.

The pipette comprises means known per se that enable the user to adjust the value of the volume to be sampled using the pipette. For this purpose, the screw 10 is in engagement with a part 50 of the body forming a nut and effecting with this a helical connection. The screw 10 has a bottom end 52 constituting a top stop for a shoulder of the rod 6 carrying the piston 21. The position of the screw 10 therefore determines the value of the volume aspirated by the piston. The user maneuvers the screw 10 using the knob 8 that rotates the rod 6 about its longitudinal axis. The rod 6 is coaxial with the screw 10 through which it extends and is rotationally fixed to the screw 10. As a result, the screw 10 is also rotated. The user can also modify the adjustment by turning a knurled wheel accessible through windows in the body 4, which are known per se and which will not be described here.

Figure 3:
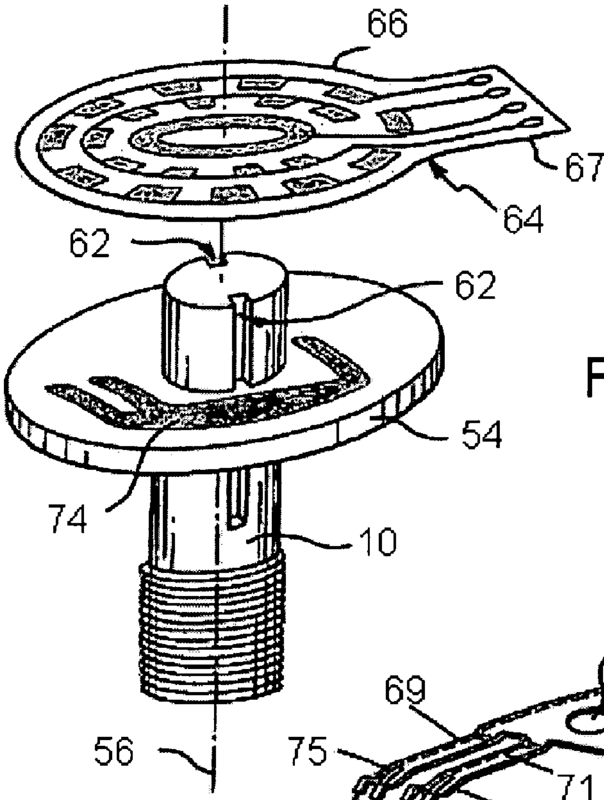
FIG. 3 is a perspective view showing the screw, the brush support, and the track support of the pipette of FIG. 1.
Figure 4:
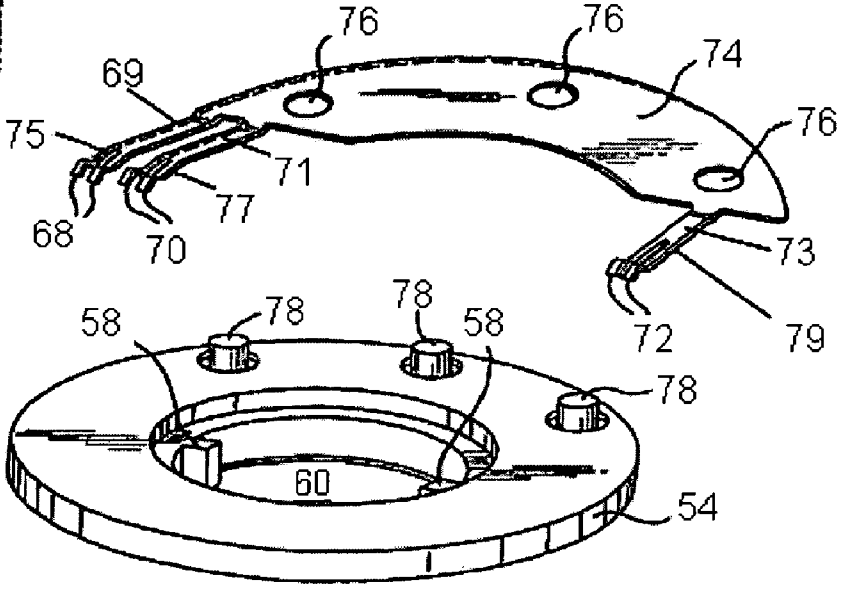
FIG. 4 is an exploded perspective view of the brushes and their support.

The pipette comprises a brush-holder plate 54 in the form of a washer, slipped onto the screw 10 as illustrated in FIG. 3. The screw 10 has been illustrated as if it were solid but it should be understood that the rod 6 passes through the screw 10. The plate 54 has essentially a flat shape and extends in a plane perpendicular to a longitudinal axis 56 of the screw 10. The plate 54 has two lugs 58 each extending in radial projection from an internal edge of a central orifice 60 in the plate 54. The screw 10 has two grooves 62 cutting into the external face of the screw 10. Each groove extends parallel to the axis 56. The plate 54 is slipped onto the screw 10 so that the lugs 58 are housed in the respective grooves 62. The plate 54 is also housed in the pipette without its height along the axis 56 being able to vary. The result of this mounting is that the plate 54 is rotationally fixed to the screw 10 during the movement of the latter about its axis 56. This rotational fixation results from the housing of the lugs 58 in the grooves 62. Nevertheless, during the helical movement of the screw 10, the plate 54 remains at the same height in the body of the pipette so that the screw 10 moves slidably with respect to the plate 54 (and vice-versa) when the adjustment of the volume to be sampled is modified.

The pipette also comprises a coder 64 arranged in this case in the form of a printed circuit. The coder 64 thus comprises a support 66 having tracks illustrated in detail in FIG. 5. The coder 64 has a flat shape and also extends in a plane perpendicular to the axis 56. The coder 64 is disposed opposite the plate 54, has a circular body, and has a protuberance 67 extending radially from an external edge of a circular body. The coder 64 is rigidly fixed to the body 4 of the pipette while being slipped onto the screw 10.

The plate 54 includes brushes, for example, the plate 54 may include six brushes arranged in pairs. Thus, in the exemplary embodiment there are a pair of brushes 68, a pair of brushes 70, and a pair of brushes 72. All of the brushes are parallel to each other in the exemplary embodiment. Each pair of brushes 68, 70, 72 extends from a tongue 69, 71, 73, respectively, and an end area 75, 77, 79, respectively, which is divided longitudinally in order to individualize the two brushes. These three tongues 69, 71, 73 are fixed to the same base 74. The assembly of the base 74 and the tongues 69, 71, 73 is formed as a single piece by cropping and forming a sheet of metal. This sheet has three holes 76 enabling the base 74 to be fixed and set in position on the plate 54 by means of three studs 78 extending from one face of the plate 54. The three studs 78 pass through the holes 76 to properly align the base 74 on the plate 54.

Figure 5:
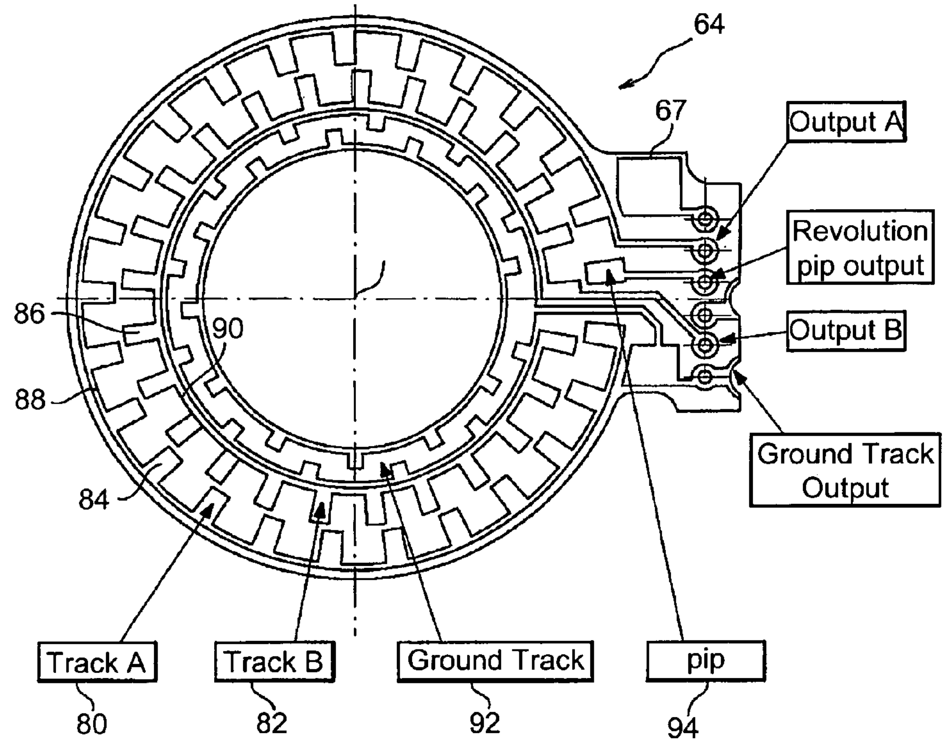
FIG. 5 is a detailed plan view of the track support of FIG. 3.

The configuration of the coder 64 will now be described in detail with reference to FIG. 5. The coder 64 comprises two circular tracks 80 and 82 or track A and track B. Each of these tracks has a plurality of increments 84, 86 identical to each other and regularly spaced apart from each other in each track. Track A and track B in the exemplary embodiment have 24 increments. In track A 80, the increments 84 are formed by rectangles connected at their external edges by an electrical link 88 arranged in an arc of a circle. The same applies to the track B 82 in which the increments 86 are connected to each other at their internal edges by means of a link 90. Track A 80 has the general configuration of a circle opened up so that its ends are not contiguous. The same applies to track B 82.

With reference to the axis 56, the measurement of the angle separating two successive increments 84 of the track A 80 is equal to the measurement of the angles separating two successive increments 86 on the track B 82. Nevertheless the increments on the two tracks 80, 82 do not coincide from one track to the other. In the present example, the increments are in partial angular overlap with reference to the angular travel of the tracks 80, 82 about the axis 56.

The coder 64 also comprises a ground track 92 having the general configuration of a closed circle so that its ends are contiguous. Finally, the coder 64 comprises a register area or revolution pip area 94 extending over a smaller angle compared with the total angle covered by each of the tracks A 80 and B 82. In this case, the register area 94 extends over a portion of an angle less than 90°. In the exemplary embodiment, the register area 94 extends between 5° and 10°. In the present example, the register area 94 is formed by a rectangle with the same shape and same dimensions as the rectangles forming each increment 84 of the track A 80. In addition, this register area is disposed at equal distances from the two increments closest respectively to the ends of track A 80 and in line with these ends.

The track A 80, the track B 82, the ground track 92, and the register area 94 are each connected by a respective conductor to an output terminal extending in the protuberance 67 of the coder 64.

In the present example, the two brushes 68 are intended to travel over the track A 80 and consequently to come into contact with only the increments 84 on this track. The same applies to the two brushes 70 and track B 82 with its increments 86. On the other hand, the two brushes 72 are intended to be permanently in contact, at least in one case, with the ground track 92. Moreover, once per revolution, the brushes 68 of the track A 80 come into contact with the register area 94. The six brushes being produced from the same metallic piece, they are permanently in electrical contact with each other and in particular, directly or indirectly, with the ground track 92.

It will therefore be understood that, during the movement of the screw 10, the brushes 68 and 70 put the output of the ground track 92 sometimes in contact only with the output of the track A 80, sometimes in contact only with the output of the track B 82, and finally sometimes in simultaneous connection with the output of the track A 80 and the output of the track B 82. Knowing that in the pipette different electrical voltages are applied between, on the one hand, the output of the track A 80 and the output of the ground track 92, and on the other, track B 82 and the output of the ground track 92, various output signals are transmitted to the microprocessor according to the travel over the increments by the brushes 68, 70.

Figure 6:
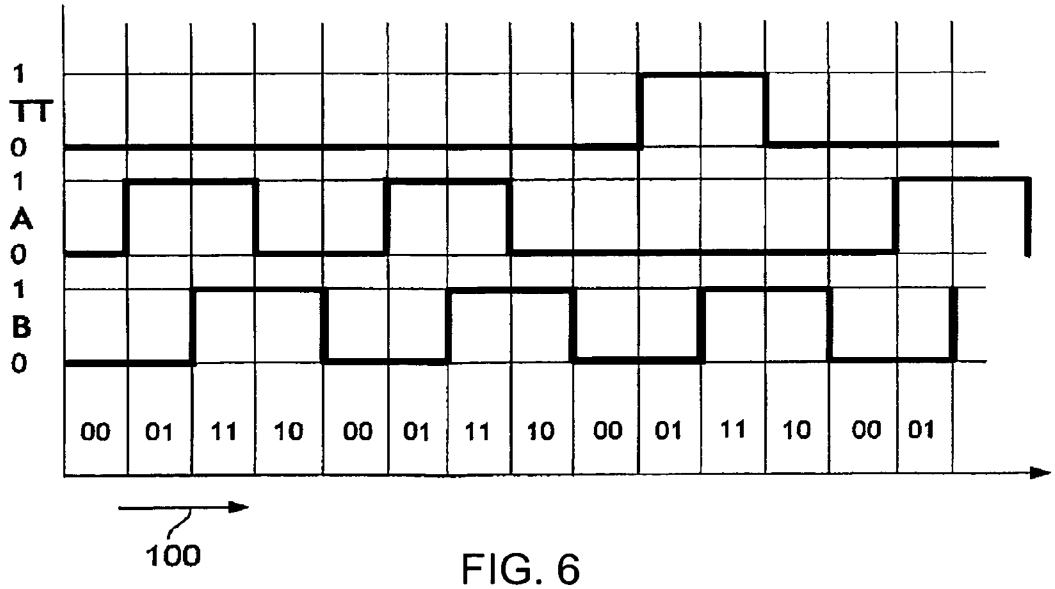
FIG. 6 is a diagram illustrating the signals received by the microprocessor of FIG. 1 when the brushes travel over the tracks.

These signals, represented in the form of 0 and 1, have been shown in FIG. 6. The bottom line corresponds to the signals emitted by virtue of the increments of the track B 82, and the middle line to the signals emitted by virtue of the increments of the track A 80. Knowing that these signals are offset from one track to the other, the microprocessor can therefore distinguish four voltage states represented respectively by “00”, “01”, “11”, “10.” In each of these symbols, the first digit represents the state of the track B 82 while the second digit represents the state of the track A 80. These various states constitute steps traveled by the brushes 68, 70.

Having regard to the partial angular overlap of the increments of the tracks A 80 and B 82, the succession of signals received by the microprocessor when the brushes 68, 70 travel over the coder 64 in a first direction illustrated by the arrow 100 in FIG. 6 comprises the sequence 00, 01, 11, 10. On the other hand, when the brushes 68, 70 travel over the coder 64 in the opposite direction to the first direction, this succession comprises the sequence 10, 11, 01, 00. This succession is therefore different from the previous succession regardless of the starting point of the brushes. The microprocessor can therefore detect the direction of rotation of the brushes 68, 70 on the coder 64. It can therefore recognize whether the volume adjustment means is manipulated to increase the volume to be sampled or on the contrary to reduce it. Thus, the microprocessor can detect the order of two successive elements in the succession, for example 10, 11 or 11, 10, in order to deduce the direction of rotation.

The microprocessor also counts the number of steps traveled over by the brushes 68, 70. Knowing that each step corresponds to a fraction of volume to be pipetted, it can therefore continuously modify the volume value displayed by the screen 12 according to the new position of the adjustment means. By way of example, it is assumed that the pipette has a total capacity of 1000 microlitres and that the means of adjusting the volume comprises 100 steps per revolution, one step corresponding to 1 microlitre. Each change in voltage state (“00”, “01”, “10”, “11”) corresponds to one step so that the tracks presented make it possible to distinguish 99 steps. Moreover, once per revolution, the brushes 68 come into contact with the register area 94 as illustrated in the top line of FIG. 6.

If, therefore, the adjustment mechanism is manipulated to make the brushes 68, 70 travel more than one revolution on the coder 64, the microprocessor detects, at each passage over the register area, that a complete revolution has been made. On each occasion, it compares the number of steps traveled since the previous contact with the area 94 with a predetermined number. This number pre-recorded in the pipette corresponds to the number of increments per revolution. If the number detected is different from the number recorded, it indicates an abnormality. In general, when an abnormality occurs, the number of steps counted is less than the number recorded. In response, the microprocessor demands a correction to the display of the value on the screen 12 to account, not for the number of steps actually counted, but of the complete revolution which has been made. In the present example, the register area 94 being in line with the track 92, the number of steps to make one revolution is 100 steps. The number of steps between two pips delivered by the register area 94 must therefore be 99.

According to the abnormalities detected and in particular their frequency or repetitiveness, provision can be made for the microprocessor to send one or more alert messages to the screen 12 or a maintenance message, or for it to make a systematic correction to the fault in the display of the value without having to make the aforementioned comparison of the numbers detected and recorded. In the absence of a register area 94, if at least one increment does not make contact with the brushes 68, 70 at each revolution, the consecutive error accumulates from revolution to revolution, which may result in disagreement between the volume actually sampled and the volume value displayed.

Each change in state of the track corresponds to a known angular shift. This enables the microprocessor to convert the signals received into a value of liquid to be sampled by the pipette. Considering this information and knowing the direction of rotation at each movement of the adjustment mechanism and the number of steps traveled, the microprocessor knows, at all times, the volume value which is to be displayed on the screen 12, which corresponds to the current position of the adjustment. It will now be explained how the volume value to be sampled is displayed when the volume adjustment means is modified while the pipette is not supplied with power.

A first step, generally carried out in the factory, consists of entering in the memory of the microprocessor of the pipette a reference value which is in this case a calibration value. The reference value is a volume value determined experimentally by measuring (in particular weighing) a volume of liquid actually sampled with the pipette and relating this measured value with a predetermined configuration of the adjustment means. It is assumed here that the calibration value corresponds to a value of 250 microlitres and corresponds to two complete revolutions plus 35 steps after the register area 94.

It is assumed now that the position of the adjustment means is modified while the pipette is without power. For example, the knob 8 is turned so that the position of the screw 10 about its axis is changed. When the pipette is once again powered up, the microprocessor will not have counted the steps traveled by the brushes 68 and 70 when the pipette was switched off. As a result, the screen 12 displays the same value as that previously displayed. This value is therefore erroneous.

So that the pipette is once again in a position to display a correct value, the following operations are performed. The user replaces the adjustment means in the bottom contact position. In this way, the screw 10 is put back in mechanical abutment against its bottom travel limit. The pipette is configured in a manner known per se so that the mechanical abutment against the bottom travel limit is detected by the microprocessor by electrical or electronic means independent of the coder 64 and brushes 68, 70. By virtue of this detection, the microprocessor recognizes that the screw 10 is at the bottom of its travel.

The user once again modifies the adjustment of the volume so as to increase this volume. When the brushes 68, 70 pass for the first time over the register area 94, this passage is detected by the microprocessor as the first passage since the placement into abutment with the bottom end. The microprocessor therefore knows to situate at this moment, the absolute position of the adjustment means with respect to the position corresponding to the calibration value, namely two revolutions plus 35 steps and 250 microlitres. It can therefore, from these two data and the number of steps traveled, calculate at any time the value of the volume to be displayed.

For example, if the counter has registered that steps have been traveled after the last contact with the register area 94, the user knows that the volume to be displayed is 250−35+10−100, that is, to say 125 microlitres.

Naturally many modifications can be made to the invention without departing from the scope thereof. For example, the register area 94 can be disposed elsewhere than in line with one of the tracks A 80 and B 82. It can have a different configuration from that of an increment. It can extend over an angular value greater than or equal to two increments. The predetermined configuration corresponding to the reference value can be a configuration other than that of an end of travel stop of the screw 10.

It is understood that the invention is not confined to the particular embodiments set forth herein as illustrative. The description of the preferred embodiments is for purposes of illustration and not limitation. Those skilled in the art shall be capable of making numerous variations and modifications to the exemplary embodiments without departing from the spirit of the present invention. All such variations and modifications are intended to be within the scope of the present invention as defined in the appended claims.

What is claimed is:

1. A sample volume adjustment apparatus of a hand-heid pipette, the apparatus comprising:
- a coder operably coupled to send an electrical signal to a microprocessor, the coder comprising
  - a first track, the first track comprising a first plurality of increments connected to a first electrical conductor; and
  - a register area connected to a second electrical conductor; and
- a first tongue operably coupled with an adjustment mechanism and mounted to contact the register area after contacting a predetermined number of the first plurality of increments, wherein the predetermined number is greater than one.

2. The apparatus of claim 1 further comprising a second tongue operably coupled with the adjustment mechanism, wherein the coder further comprises a second track comprising second plurality of increments, and further wherein the second tongue is mounted to contact the second plurality of increments.

3. The apparatus of claim 2 further comprising a third tongue operably coupled with the adjustment mechanism, wherein the coder further comprises a third track, and further wherein the third tongue is mounted to contact he third track.

4. The apparatus of claim 3 wherein the third track is an electrical ground.

5. The apparatus of claim 4 wherein the third tongue is mounted to continuously contact the third track.

6. The apparatus of claim 2 wherein the first tongue and the second tongue are arranged in parallel.

7. The apparatus of claim 1 further comprising the microprocessor wherein the microprocessor is configured to:
- detect a first contact between the first tongue and the register area;
- detect a plurality of contacts between the first tongue and the first plurality of increments;
- detect a second contact between the first tongue and the register area;
- compare the number of the detected plurality of contacts with a predetermined number; and
- if the number of the detected plurality of contacts is different than the predetermined number, notify a user of the difference.

8. The apparatus of claim 7 further comprising a display wherein the display is configured to display an alert message if the number of the detected plurality of contacts is different than the predetermined number.

9. The method of claim 7 wherein the microprocessor is further configured to determine a sample volume value using the detected plurality of contacts.

* * * * *